United States Patent
Moriyama et al.

(10) Patent No.: US 8,669,762 B2
(45) Date of Patent: Mar. 11, 2014

(54) ELECTROMAGNETIC WAVE DETECTION METHODS AND APPARATUS

(75) Inventors: Takahiro Moriyama, Ithaca, NY (US); John Q Xiao, Newark, DE (US)

(73) Assignee: University of Delaware, Newark, DE (US)

( * ) Notice: Subject to any disclaimer, the term of this patent is extended or adjusted under 35 U.S.C. 154(b) by 601 days.

(21) Appl. No.: 12/865,182

(22) PCT Filed: Feb. 3, 2009

(86) PCT No.: PCT/US2009/032945
§ 371 (c)(1),
(2), (4) Date: Aug. 11, 2010

(87) PCT Pub. No.: WO2009/102577
PCT Pub. Date: Aug. 20, 2009

(65) Prior Publication Data
US 2011/0001473 A1  Jan. 6, 2011

Related U.S. Application Data

(60) Provisional application No. 61/028,286, filed on Feb. 13, 2008.

(51) Int. Cl.
*G01R 33/02* (2006.01)

(52) U.S. Cl.
USPC .............................................. 324/244

(58) Field of Classification Search
USPC .................................. 324/244–263
See application file for complete search history.

(56) References Cited

U.S. PATENT DOCUMENTS

| | | | |
|---|---|---|---|
| 4,908,694 A | 3/1990 | Hidaka et al. | |
| 6,011,981 A | 1/2000 | Alvarez et al. | |
| 6,201,259 B1 * | 3/2001 | Sato et al. | 257/30 |
| 6,522,134 B1 * | 2/2003 | Gill | 324/210 |
| 6,842,368 B2 | 1/2005 | Hayakawa | |
| 6,914,807 B2 * | 7/2005 | Nakamura et al. | 365/158 |
| 6,956,269 B1 * | 10/2005 | Vashchenko et al. | 257/421 |
| 7,224,601 B2 * | 5/2007 | Panchula | 365/158 |
| 7,272,033 B2 * | 9/2007 | Kim et al. | 365/158 |
| 7,274,080 B1 | 9/2007 | Parkin | |
| 7,750,390 B2 * | 7/2010 | Saito et al. | 257/314 |

(Continued)

FOREIGN PATENT DOCUMENTS

WO    WO 0223638 A2 *  3/2002

OTHER PUBLICATIONS

Cywinski, Proposal of a spintronics-based polarization detector, 2005, pp. 8-9.*

(Continued)

*Primary Examiner* — Jermele M Hollington
*Assistant Examiner* — Demetrius Pretlow
(74) *Attorney, Agent, or Firm* — RatnerPrestia

(57) ABSTRACT

Methods and apparatus for detecting an electromagnetic wave are provided. A device for use in an electromagnetic wave detector includes a first device layer having a first contact, a second device layer having a second contact, and a tunnel barrier layer and a resonating magnetic layer formed between the first and second device layers. The resonating magnetic layer produces a spin current responsive to an electromagnetic wave that extends into the first and second device layers. A charge differential present between the first and second contacts is dependent on the spin current.

22 Claims, 9 Drawing Sheets

(56) References Cited

U.S. PATENT DOCUMENTS

| | | | |
|---|---|---|---|
| 7,859,349 B2 * | 12/2010 | Eyckmans et al. | 331/94.1 |
| 2002/0006058 A1 * | 1/2002 | Nakajima et al. | 365/171 |
| 2002/0096698 A1 * | 7/2002 | Flatte et al. | 257/295 |
| 2003/0048676 A1 * | 3/2003 | Daughton et al. | 365/200 |
| 2003/0075772 A1 * | 4/2003 | Efros et al. | 257/500 |
| 2004/0113188 A1 * | 6/2004 | Schmidt et al. | 257/295 |
| 2004/0183151 A1 * | 9/2004 | Flatte et al. | 257/421 |
| 2004/0246631 A1 * | 12/2004 | Dieny et al. | 360/324.1 |
| 2004/0253480 A1 * | 12/2004 | Osipov et al. | 428/692 |
| 2005/0021927 A1 * | 1/2005 | Machida et al. | 712/32 |
| 2005/0161630 A1 | 7/2005 | Chui et al. | |
| 2005/0185346 A1 * | 8/2005 | Shoji | 360/324.1 |
| 2005/0195532 A1 * | 9/2005 | Sugiyama et al. | 360/322 |
| 2006/0098354 A1 | 5/2006 | Parkin | |
| 2006/0130193 A1 * | 6/2006 | Roy | 977/935 |
| 2006/0158927 A1 * | 7/2006 | Johnson | 365/158 |
| 2006/0186432 A1 * | 8/2006 | Osipov et al. | 257/103 |
| 2006/0221507 A1 * | 10/2006 | Sato et al. | 360/324 |
| 2006/0262458 A1 * | 11/2006 | Carey et al. | 360/324.2 |
| 2008/0085567 A1 * | 4/2008 | Tanaka et al. | 438/3 |
| 2008/0144232 A1 * | 6/2008 | Kaka et al. | 360/324.1 |
| 2009/0058562 A1 * | 3/2009 | Joodaki | 333/208 |
| 2009/0141409 A1 * | 6/2009 | Santos et al. | 360/324.2 |

OTHER PUBLICATIONS

International Search Report for PCT International Patent Application No. PCT/US2009/032945 mailed Apr. 2, 2009.

Heinrich et al., "Intrinsic Spin Relaxation Processes in Metallic Magnetic Multilayers," Journal of Superconductivity and Novel Magnetism, vol. 20, No. 2, Feb. 2007, pp. 83-89.

Kiselev et al., "Microwave oscillations of a nanomagnet driven by a spin-polarized current," Nature, vol. 425, Sep. 2003, pp. 380-383.

Costache et al., "Electrical Detection of Spin Pumping due to the Processing Magnetization of a Single Ferromagnet," Physical Review Letters 97, 216603 (2006).

Grollier et al., "Synchronization of spin-transfer oscillators driven by stimulated microwave currents," Physical Review B 73, 060409® (2006).

Tserkovnyak et al., "Nonlocal magnetization dynamics in ferromagnetic heterostructures,"Reviews of Modern Physics, vol. 77, Oct. 2005, pp. 1375-1421.

Wang et al., "Voltage Generation by Ferromagnetic Resonance at a Nonmagnet to Ferromagnet Contact," Physical Review Letters 97, 216602 (2006).

Brataas et la., "Spin battery operated by ferromagnetic resonance," Physical Review B 66, 060404® (2002).

Mizukami et al., "Ferromagnetic resonance linewidth for NM/80NiFe/NM films (NM=Cu, Ta, Pd and Pt)," Journal of Magnetism and Magnetic Materials 226-230 (2001), pp. 1640-1642.

Heinrich et al., "Dynamic Exchange Coupling in Magnetic Bilayers," Physical Review Letters, vol. 90, No. 18 (2003).

Gerrits et al., "Enhanced ferromagnetic damping in Permalloy/Cu bilayers," Journal of Applied Physics 99, 023901 (2006).

* cited by examiner

US 8,669,762 B2

ELECTROMAGNETIC WAVE DETECTION METHODS AND APPARATUS

CROSS REFERENCE TO RELATED APPLICATIONS

This application is a U.S. National Phase Application of PCT International Application No. PCT/US2009/032945, filed Feb. 3, 2009, which claims the benefit of U.S. Provisional Application No. 61/028,286 entitled ELECTROMAGNETIC WAVE DETECTION METHODS AND APPARATUS filed on Feb. 13, 2008, the contents of which are incorporated herein by reference.

STATEMENT REGARDING FEDERALLY SPONSORED RESEARCH

The National Science Foundation provided funding under DMR Grant No. 0405136. The government may have rights to this invention.

FIELD OF THE INVENTION

The present invention relates to the field of electronics and, more particularly, to electromagnetic wave detection methods and apparatus.

BACKGROUND OF THE INVENTION

Electromagnetic wave detectors are used to detect electromagnetic waves. There is an ever present desire for improved electromagnetic wave detectors. Accordingly, electromagnetic wave detectors are useful.

SUMMARY OF THE INVENTION

The present invention is embodied in a device for use in an electromagnetic wave detector. The device includes a first device layer having a first contact, a second device layer formed from a nonmagnetic material having a second contact, and a tunnel barrier layer and a resonating magnetic layer formed between the first and second device layers. The resonating magnetic layer produces a spin current responsive to an electromagnetic wave that extends into the first and second device layers. A charge differential present between the first and second contacts is dependent on the spin current.

The present invention is also embodied in an electromagnetic wave detector including a device and a detector. The device includes a first device layer, a second device layer formed from a nonmagnetic material, and a tunnel barrier layer and a resonating magnetic layer formed between the first and second device layers. The resonating magnetic layer produces a spin current responsive to an electromagnetic wave that extends into the first and second device layers. The detector is coupled to the first and second device layers and measures a charge differential between the first and second device layers that is dependent upon the spin current.

The present invention is also embodied in methods for forming a device for use in an electromagnetic wave detector. The electromagnetic wave detector is formed by forming a first device layer, forming a second device layer from a nonmagnetic material, forming a tunnel barrier layer and a resonating magnetic layer between the first and second device layers, and forming first and second contacts on the first and second device layers, respectively. The resonating magnetic layer is formed such that a spin current is produced responsive to an electromagnetic wave that extends into the first and second device layers. A charge differential is present between the first and second contacts that is dependent on the spin current.

BRIEF DESCRIPTION OF THE DRAWINGS

The invention may be understood from the following detailed description when read in connection with the accompanying drawings. It is emphasized that, according to common practice, various features/elements of the drawings may not be drawn to scale. On the contrary, the dimensions of the various features/elements may be arbitrarily expanded or reduced for clarity. Moreover, in the drawings, common numerical references are used to represent like features/elements. Included in the drawing are the following figures.

DETAILED DESCRIPTION OF THE INVENTION

The field of spintronics generally relates to the detection and/or manipulation of electron spin. A conventional spintronic device is a tri-layer device that includes a ferromagnetic layer formed between two normal metal layers. The device uses a single precessing ferromagnetic layer as both a source and a detector of pumped spin accumulation in the normal metal layers. Such a tri-layer device is capable of generating direct current (DC) voltages on the order of about several hundred nanovolts due to the magnetization precessing in the ferromagnetic layer excited by an external electromagnetic wave (at approximately 2 GHz and about 8 mW microwave input).

Aspects of the present invention include a device for use in an electromagnetic wave detector that may convert energy received from an electromagnetic wave into a DC charge or a spin current. An exemplary device includes a first device layer having a first contact, a second device layer formed from a nonmagnetic material having a second contact, a tunnel barrier layer and a resonating magnetic layer. The tunnel barrier layer and the resonating magnetic layer are formed between the first and second device layers. The resonating magnetic layer produces a spin current responsive to an electromagnetic wave that extends into the first and second device layers. A charge differential is measured between the first and second contacts that is dependent on the spin current and is, thus, indicative of the electromagnetic wave. The first device layer may be formed from a magnetic or nonmagnetic material.

The exemplary device converts the energy of an electromagnetic wave into a spin current through precessing magnetization. The spin current is converted into a charge current through spin-charge coupling in the magnetic resonating material layer. A detector may be used with the device (as an electromagnetic wave detector) to measure a charge differential between the first and second device layer that is dependent on the spin current.

Figure 1:
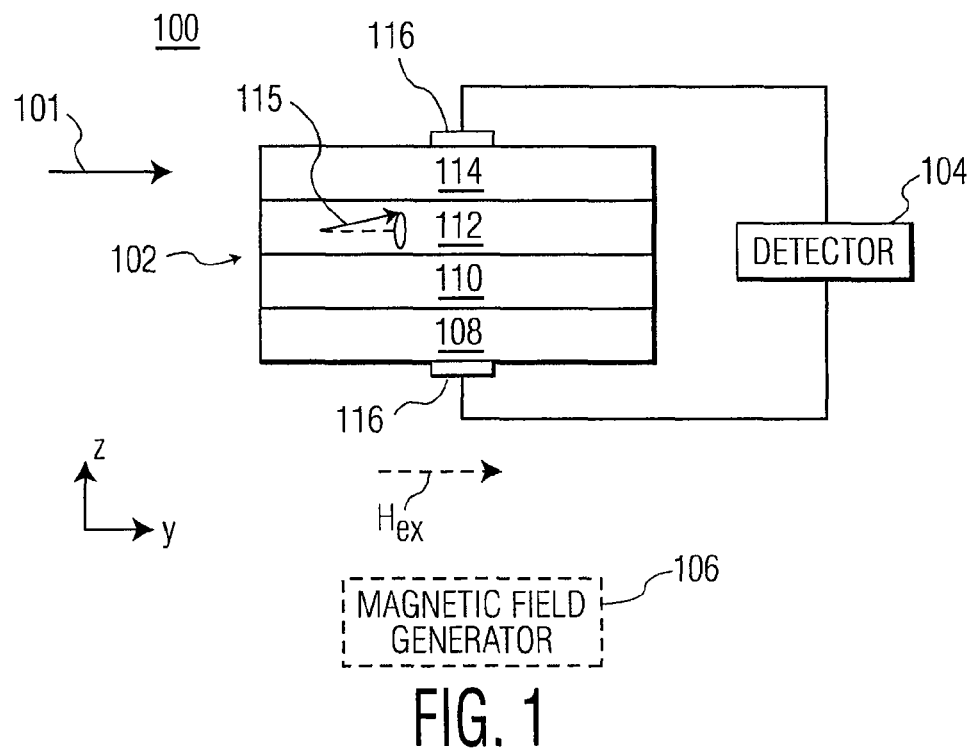
FIG. 1 is a block diagram illustrating an exemplary electromagnetic wave detector, according to an embodiment of the present invention.

Referring now to FIG. 1, a block diagram of an exemplary electromagnetic wave detector 100 is shown. Electromagnetic wave detector 100 includes device 102 and detector 104. Optionally, electromagnetic wave detector 100 may include magnetic field generator 106, that may be used to generate an external DC magnetic field, $H_{ex}$, to adjust a resonance frequency of device 102. As described further below with respect to FIG. 5, $H_{ex}$ may be used to adjust the resonance frequency of resonating magnetic layer 112.

Device 102 includes first device layer 108, tunnel barrier layer 110 which allows electrons to quantum mechanically tunnel through tunnel barrier layer 110, resonating magnetic layer 112, and second device layer 114. Tunnel barrier layer 110 and resonating magnetic layer 112 are formed between first device layer 108 and second device layer 114. Although FIG. 1 illustrates tunnel barrier layer 110 formed above first device layer 108 and resonating magnetic layer 112 formed above tunnel barrier layer 110, it is contemplated that a resonating magnetic layer may be formed above first device layer 108 and that a tunnel barrier layer may be formed above the resonating magnetic layer. In general, device 102 may be formed to have an impedance that substantially matches an ambient impedance surrounding the device.

First device layer 108 may be formed from magnetic materials or non-magnetic materials. Suitable materials for use as first device layer 108 will be understood by one of skill in the art from the description herein. Tunnel barrier layer 110 may be formed from insulator materials. Examples of suitable insulator materials include, but are not limited to, aluminum oxide, magnesium oxide, hafnium oxide, and zirconium oxide. Resonating magnetic layer 112 may be formed from magnetic materials having a resonance frequency in a frequency range corresponding to a frequency of an electromagnetic wave. Resonating magnetic layer 112 may include ferromagnetic materials, ferrimagnetic materials or antiferromagnetic materials. Second device layer 114 may be formed from nonmagnetic metallic materials including, but not limited to, Cu, Al, gold (Au), silver (Ag), tungsten (W), platinum (Pt) and palladium (Pd) or antiferromagnetic metallic materials including but not limited to, chromium (Cr).

By radiating device 102 with an electromagnetic wave 101 whose frequency corresponds to the resonance frequency of resonating magnetic layer 112, the magnetization of magnetic layer 112 precesses. If an external DC field, $H_{ex}$ is applied (by magnetic field generator 106), the magnetization of magnetic layer 112 precesses around the direction of $H_{ex}$. The magnetization precession in magnetic layer 112 generates a spin current 115 into neighboring layers (i.e. into layers 108, 110 and 114) and also develops a spin accumulation within magnetic layer 112.

If first device layer 108 is formed from a non-magnetic material, a DC voltage is developed across a tunnel junction (between resonating magnetic layer 112 and first device layer 108). If first device layer 108 is formed from a magnetic material, a DC voltage may be developed, whose magnitude may depend on the spin configuration (i.e. parallel or antiparallel configuration).

Detector 104 may be electrically connected to device 102 between first device layer 108 and second device layer 114 via contacts 116. In general, detector 104 may measure a charge differential between first device layer 108 and second device layer 114 that is dependent on spin current 115. In an exemplary embodiment, detector 104 includes a voltmeter that monitors the DC voltage. In an alternative embodiment, detector 104 may monitor a current.

Figure 2:
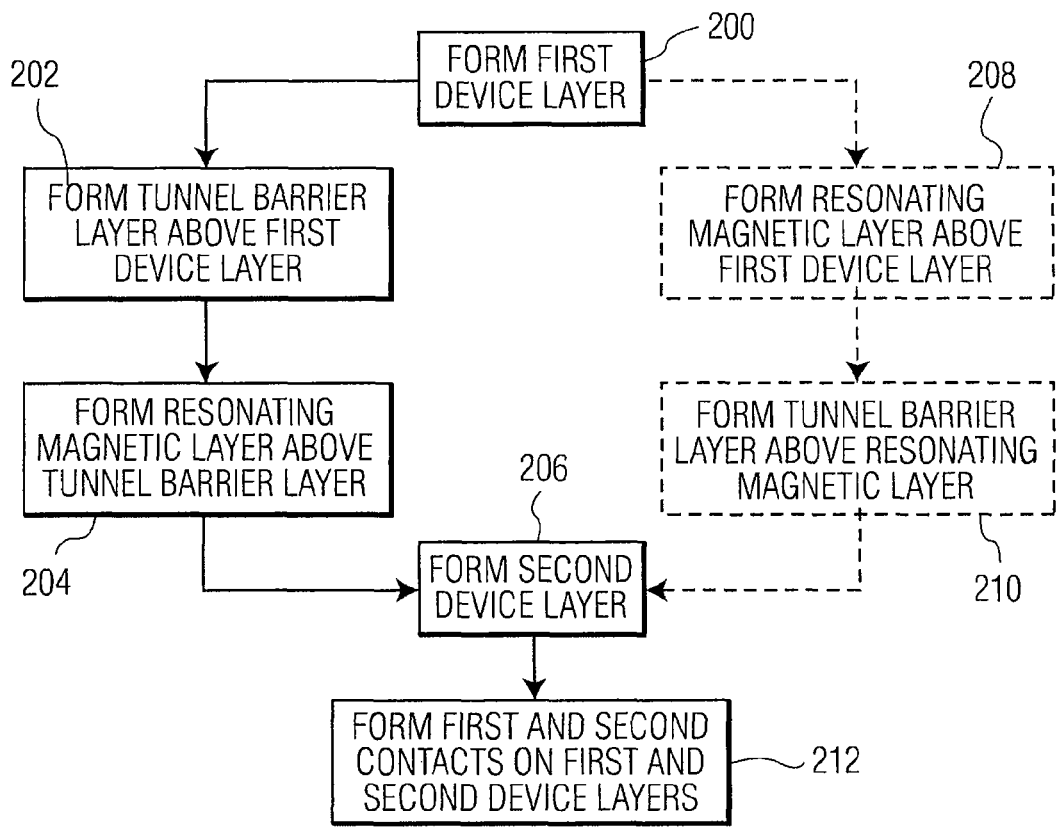
FIG. 2 is a flowchart illustrating an exemplary method for forming a device for use in an electromagnetic wave detector, according to an embodiment of the present invention.

FIG. 2 is a flowchart illustrating an exemplary method of forming device 102 for use as an electromagnetic wave detector. At step, 200, first device layer 108 is formed. At step 202, tunnel barrier layer 110 is formed above first device layer 108. At step 204, resonating magnetic layer 112 is formed above tunnel barrier layer 110. At step 206, second device layer 114 is formed above resonating magnetic layer 112. At step 212, a first contact 116 is formed on first device layer 108 and a second contact 116 is formed on second device layer 114. A charge differential may be measured between the first and second contacts that is dependent on the spin current. Steps 202-206 and 212 may be performed using conventional film deposition techniques that will be understood by one of skill in the art from the description herein.

Optionally, instead of forming tunnel barrier layer 110 and resonating magnetic layer 112 as described in steps 202 and 204 and shown in FIG. 1, a tunnel barrier layer and a resonating magnetic layer may be formed as at optional steps 208 and 210. Accordingly, at optional step 208, a resonating magnetic layer is formed above first device layer 108. At optional step 210, a tunnel barrier layer is formed above the resonating magnetic layer formed at step 208. At step 206, second device layer 114 is formed above the tunnel barrier layer formed at step 210.

Figure 3A:
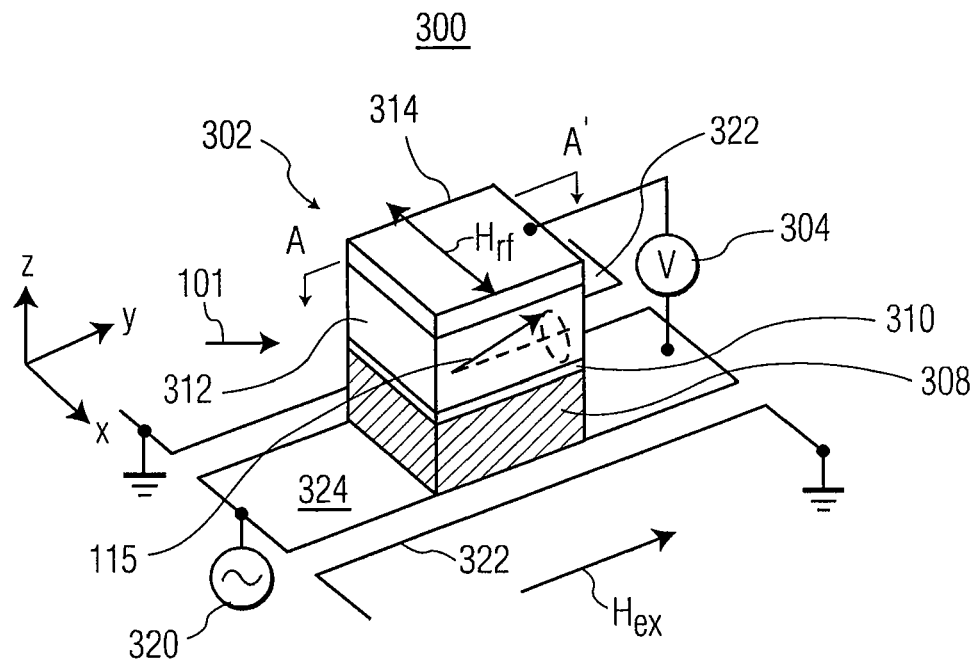
FIG. 3A is a block diagram illustrating an exemplary electromagnetic wave detector, according to another embodiment of the present invention.
Figure 3B:
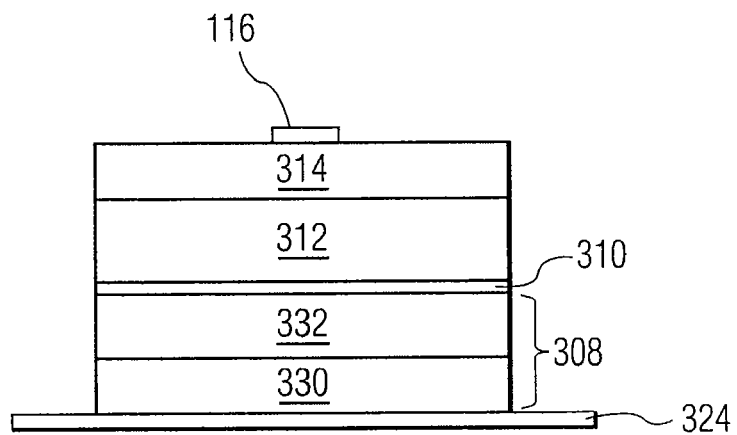
FIG. 3B is a cross section diagram taken along line A-A' of a device of the electromagnetic wave detector shown in FIG. 3A.

Referring to FIGS. 3A and 3B, another exemplary electromagnetic detector 300 is shown. In particular, FIG. 3A is a block diagram illustrating electromagnetic wave detector 300, according to another embodiment of the present invention; and FIG. 3B is a cross section diagram taken along line A-A' of device 302 of electromagnetic wave detector 300.

Electromagnetic wave detector 300 includes device 302, detector 304, and magnetic field generator 106 (not shown) that generates external magnetic field $H_{ex}$. Device 302 is formed on conductor plane 324 such that detector 304 is coupled between first device layer 308 and second device layer 314 via conductor plane 324 and contact 116. A ground plane 322 is situated proximate to conductor plane 324. A reference wave generator 320 is coupled to conductor plane 324 to provide an reference electromagnetic wave, described further below with respect to FIG. 5.

Device 302 includes first device layer 308, tunnel barrier layer 310, resonating magnetic layer 312 and second device layer 314. First device layer 308 includes Cu layer 330 having a thickness of 100 nm and Al layer 332 having a thickness of 10 nm. Tunnel barrier layer 310 is formed from aluminum oxide ($AlO_x$) having a thickness of 2.3 nm. Resonating magnetic layer 312 is formed from nickel (Ni) and iron (Fe), such as $Ni_{80}Fe_{20}$, having a thickness of 20 nm. Second device layer 314 is formed from Cu having a thickness of 70 nm.

Device 302 is fabricated on a silicon (Si) substrate with a 1 µm thick thermal oxide layer, by using magnetron sputtering deposition and a conventional microfabrication processing. Copper layer 330 is patterned into a coplanar waveguide (CPW) designed to have 50Ω characteristic impedance in the absence of the tunnel structure, in order to effectively couple with the microwave power. The aluminum oxide tunnel barrier layer 310 is formed by plasma oxidation following a 2.3 nm aluminum deposition. The oxidation condition is precisely controlled to oxidize only a 2.3 nm aluminum layer. The size of a tunnel junction pillar is 50×50 µm², and the DC junction resistance was measured as 67 kΩ. Although the CPW is illustrated as being used for efficient microwave power coupling with device 302, it is understood that electromagnetic wave detection by device 302 may be obtained without using a coplanar waveguide.

Figure 4A:
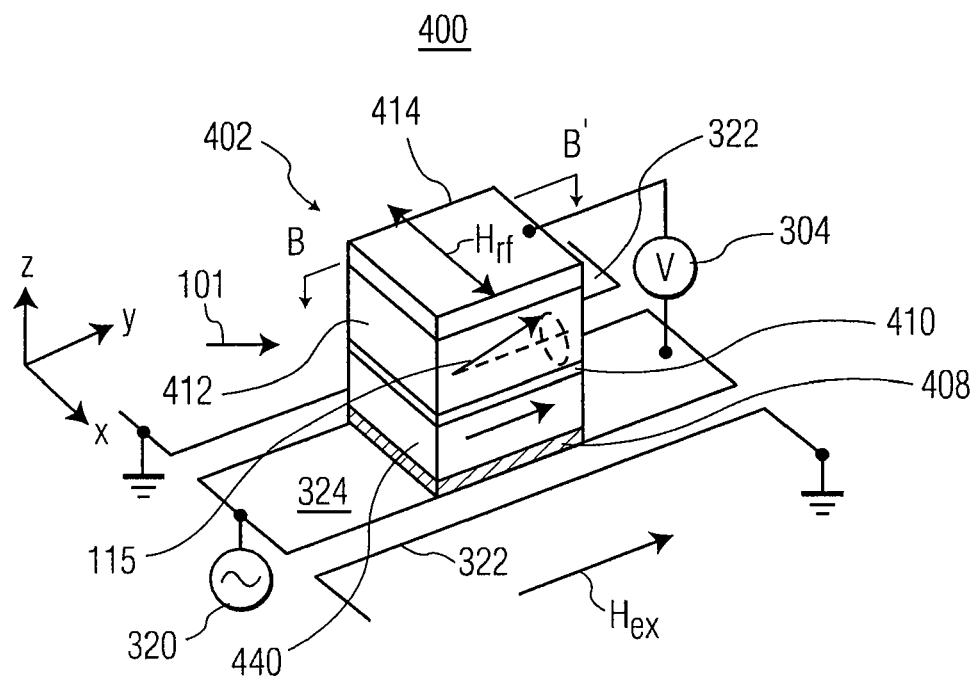
FIG. 4A is a block diagram illustrating an exemplary electromagnetic wave detector, according to a further embodiment of the present invention.
Figure 4B:
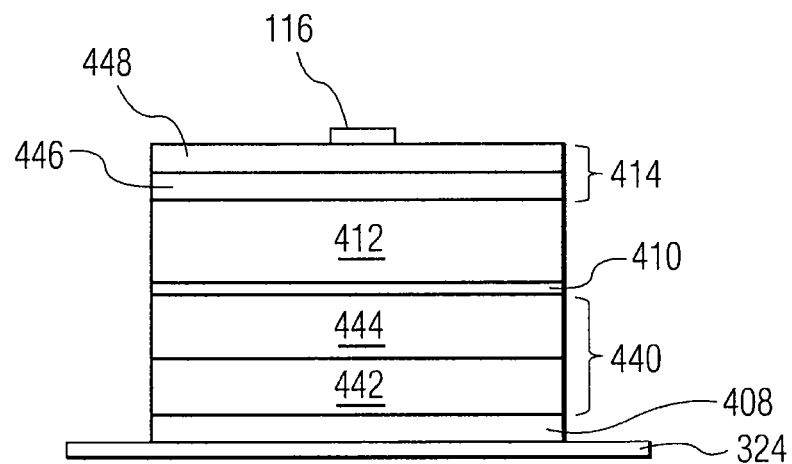
FIG. 4B is a cross section diagram taken along line B-B' of a device of the electromagnetic wave detector shown in FIG. 4A.

Referring to FIGS. 4A and 4B, a further exemplary electromagnetic detector 400 is shown. In particular, FIG. 4A is a is a block diagram illustrating electromagnetic wave detector 400, according to a further embodiment of the present invention; and FIG. 4B is a cross section diagram taken along line B-B' of device 402 of electromagnetic wave detector 400.

Electromagnetic wave detector 400 includes device 402, detector 304, and magnetic field generator 106 (not shown) that generates external magnetic field $H_{ex}$. Electromagnetic wave detector 400 is similar to electromagnetic wave detector 300 except that electromagnetic wave detector 400 includes device 402.

Device 402 includes first device layer 408, tunnel barrier layer 410, resonating magnetic layer 412 and second device layer 414. Device 402 also includes magnetization pinning layer 440. First device layer 408 is formed from Cu and has a thickness of 100 nm. Magnetization pinning layer 440 is formed from iridium (Ir) and manganese (Mn) layer 442, such as $Ir_{24}Mn_{76}$, having a thickness of 15 nm and iron (Fe) and cobalt (Co) layer 444, such as $Fe_{30}Co_{70}$, having a thickness of 6 nm. Tunnel barrier layer 410 is formed from aluminum oxide having a thickness of 2.3 nm. Resonating magnetic layer 412 is formed from $Ni_{80}Fe_{20}$ having a thickness of 20 nm. Second device layer 414 is formed from Cu layer 446 having a thickness of 70 nm and Au layer 448 having a thickness of 25 nm.

Device 402 may be formed in a manner similar to device 302 except that device 402 includes a 15 nm antiferromagnetic $Ir_{24}Mn_{76}$ layer 442 and a 6 nm $Fe_{30}Co_{70}$ layer 444. The $Ir_{24}Mn_{76}$ layer 442 is positioned to pin or fix the magnetization of $Fe_{30}Co_{70}$ layer 444 through exchange coupling. In this arrangement, the magnetization of $Fe_{30}Co_{70}$ will not precess in the presence of a microwave. Layers 446 and 448 are used to protect the magnetic layer from oxidation and for electrical connection. Although Au layer 448 is illustrated in FIG. 4B, the inclusion of layer 448 is optional.

Figure 5:
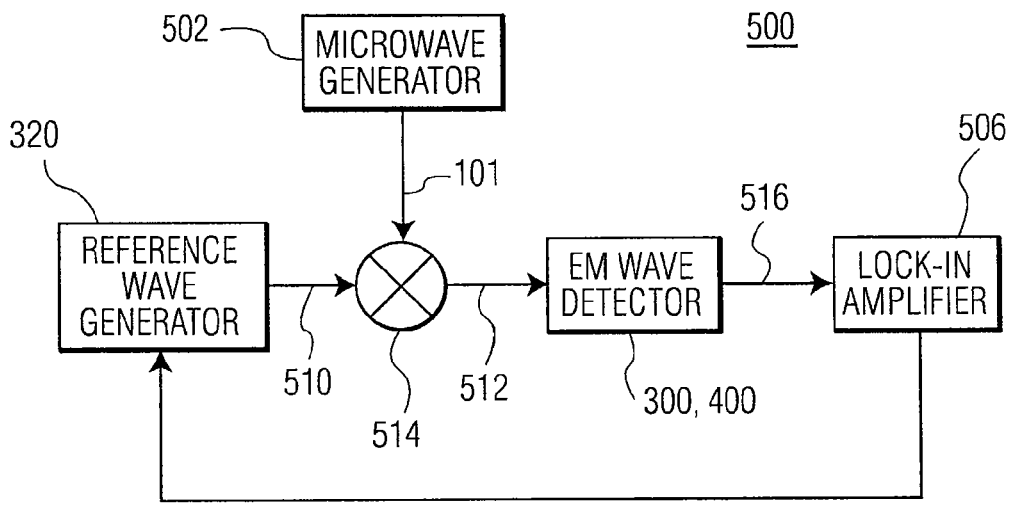
FIG. 5 is a block diagram illustrating a device for measuring parameters of the exemplary electromagnetic wave detectors shown in FIGS. 3A and 4A.

Referring to FIG. 5, device 500 for measuring parameters of the electromagnetic wave detectors 300, 400 is shown. Device 500 generally includes an electromagnetic (EM) wave detector (e.g., electromagnetic wave detectors 300,400), reference wave generator 320, microwave generator 502 and lock-in amplifier 506. Suitable devices for reference wave generator 320, microwave generator 502 and lock-in amplifier 506 will be understood by the skilled person from the description herein.

In an experimental setup, the DC voltage across device 302 (402) was measured by detector 304. Microwave generator 502 varied microwave input signal 101 from about 0.7 GHz to about 4 GHz, with power up to about 18 dBm (63 mW). Reference wave generator 320 provided a sinusoidal signal 510 of about 400 Hz. The microwave signal 101 and sinusoidal signal are generally combined by combiner 514 to produce an amplitude modulated signal 512. The amplitude modulated signal 512 is provided to electromagnetic wave detector 300 (400) for electromagnetic wave detection. A resulting sinusoidal signal 516, after DC voltage detection, is provided to lock-in amplifier 506. Reference wave generator 320 is used to allow for lock-in detection by lock-in amplifier 506.

Referring to FIGS. 3A, 4A, and 5, a microwave 101 was generated by microwave generator 502 and introduced through a coplanar waveguide (such as Cu layer 330 (FIG. 3B). Microwave 101 generated a microwave magnetic field $H_{rf}$ that was linearly polarized in the plane of the tunnel junction. An external DC magnetic field $H_{ex}$ was swept along the axis of the CPW (in the y-direction), so that the magnetization changed its direction within the x-y plane. A precessing spin mainly rotated around the y-axis. The magnetization precession motion gives out a pure spin current into the neighboring layers. The spin current is converted to a DC voltage due to a spin-orbit interaction either in the precession magnetization itself or in a magnetization in the other layer.

In the experimental setup, the DC voltage of microwave 101 is monitored by detector 304 with application of external DC magnetic field $H_{ex}$. The DC magnetic field is increased or decreased so as to match the resonance field so that magnetization precession occurs. The resonant condition can be estimated by using the Kittel model shown in eq. (1) as:

$$\omega = \gamma \sqrt{(H+H_k)(H+H_k+4\pi M_{eff})}, \qquad (1)$$

where H is an external DC magnetic field, $H_k$ is the magnetic anisotropy field, and $4\pi M_{eff}$ ($M_{eff}$ also referred to herein as $M_s$) is the saturation magnetization of the magnetic layer.

In this manner, the external magnetic field, $H_{ex}$, may used to adjust the resonance frequency of the resonating magnetic layer (312, 412) to substantially match the frequency of the electromagnetic wave 101.

Next, measurement results using measurement configuration 500 (FIG. 5) for device 302 (FIG. 3B) are shown with respect to FIGS. 6-9 below.

Figure 6:
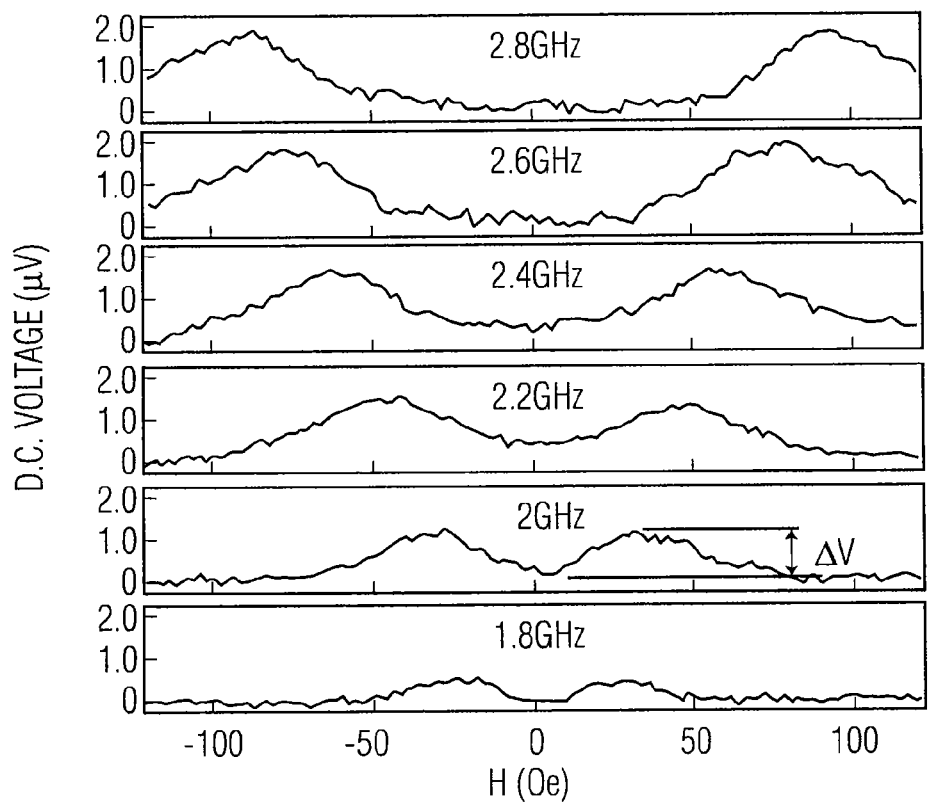
FIG. 6 is a graph of DC voltage as a function of an external magnetic field for the device shown in FIG. 3A.

FIG. 6 is a graph of the DC voltage as a function of the external magnetic field in the device 302. In FIG. 6, results for microwave frequencies 1.8 GHz, 2 GHz, 2.2 GHz, 2.4 GHz, 2.6 GHz, and 2.8 GHz are shown. As shown in FIG. 6, at each microwave frequency, voltage peaks of magnitude ΔV appear symmetrically at positive (i.e. greater than 0) and negative external magnetic fields (i.e. less than zero).

Figure 7:
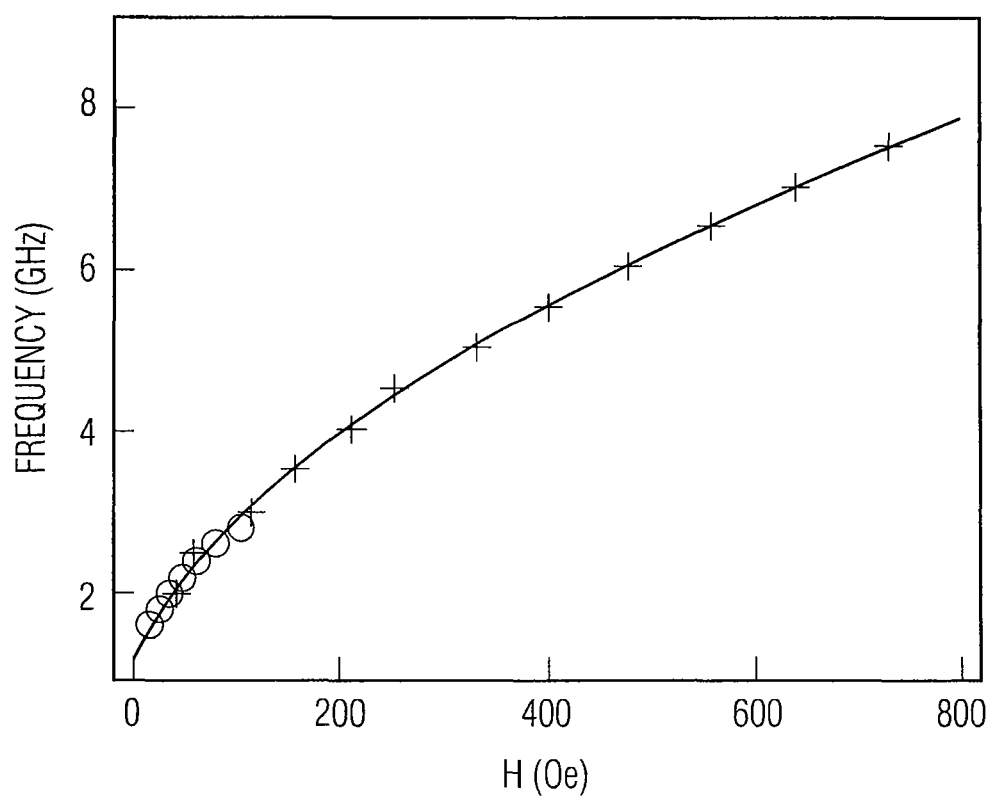
FIG. 7 is a graph of a peak field as a function of microwave frequency for the device shown in FIG. 3A.

FIG. 7 is a graph of the peak field as a function of the microwave frequency. As shown in FIG. 7, the peak field agrees well with values obtained from the flip-chip CPW ferromagnetic resonance (FMR) measurements. The Kittel formula (eq. (1)) fits the data with reasonable parameters, $4\pi M_s = 9$ kG (gauss), $H_k = 19$ Oe (oersted), and gyromagnetic ratio $\gamma = 0.0176$ $s^{-1}Oe^{-1}$, confirming that the DC voltage peak appears at the uniform FMR mode of the $Ni_{80}Fe_{20}$ layer 312 (FIG. 3B). The peak magnitude reaches about 1 µV at 2 GHz, which is much larger than the maximum value of about 250 nV at 14.5 GHz previously reported for a $Pt/Ni_{80}Fe_{20}/Al$ structure. In FIG. 7, the crosses represent experimental results using a conventional ferromagnetic resonance (FMR) measurement technique, the circles represent field positions at which the peak voltages are observed (FIG. 6), and the solid line represents a theoretical fitting using the Kittel model (eq. 1).

Figure 8A:
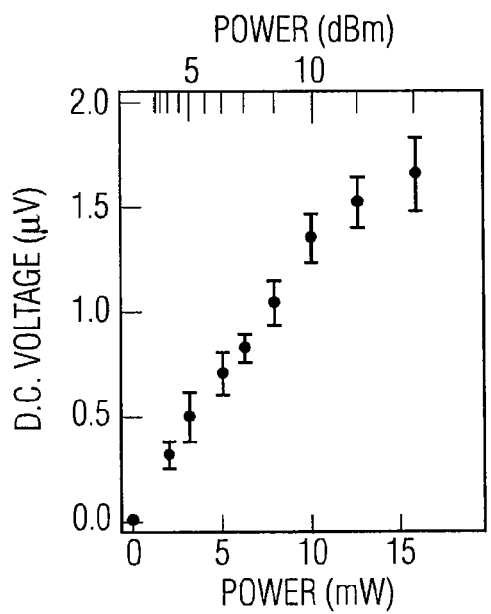
FIGS. 8A, 8B, and 8C are graphs of DC voltage as a function of power, precession angle and frequency, respectively, for the device shown in FIG. 3A.
Figure 8B:
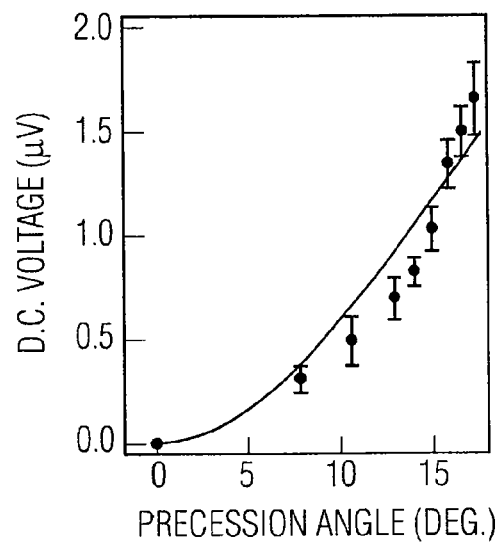
Figure 8C:
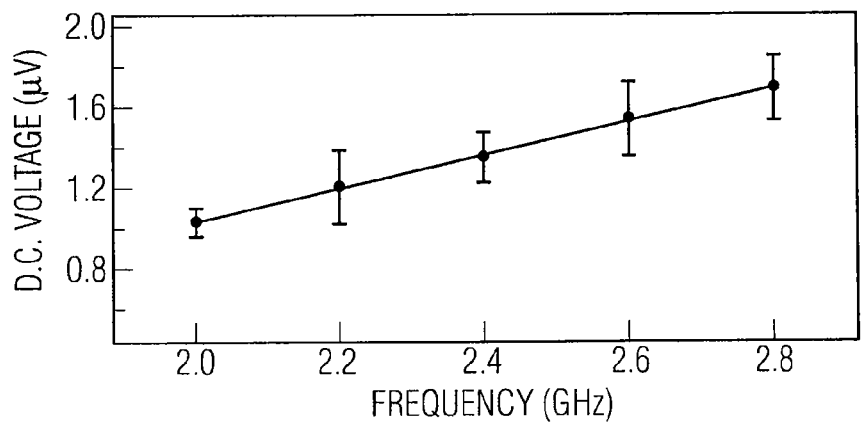

FIGS. 8A, 8B, and 8C are graphs illustrating a microwave power, frequency and precession angle dependence of voltage peaks ΔV. In particular, FIG. 8A is a graph of DC voltage as a function of power; FIG. 8B is a graph of DC voltage as a function of precession angle; and FIG. 8C is a graph of DC voltage as a function of frequency.

FIG. 8A is a graph of a microwave power and frequency dependence of ΔV, which increases with increasing microwave power. FIG. 8B also illustrates ΔV as a function of precession cone angle. The precession cone angle of the $Ni_{80}Fe_{20}$ layer 312 (FIG. 3B) is determined by the change in the tunnel resistance at the FMR field in the $IrMn/Fe_{70}Co_{30}/AlO_x/Ni_{80}Fe_{20}$ magnetic tunnel junctions, with a 20 mV bias voltage (so that the DC voltage effect in the microvolt order can be neglected). In FIG. 8B, a dip in antiparallel states and a peak in parallel states are clearly observed corresponding to FMR fields. The precession angle θ can be determined from $\Delta R/R \propto (1-\cos\theta)$, such that, at 10 dBm power input, the precession cone angle was determined to be about 17°. FIG. 8C illustrates that ΔV increases almost linearly as the applied frequency increased.

Figure 9:
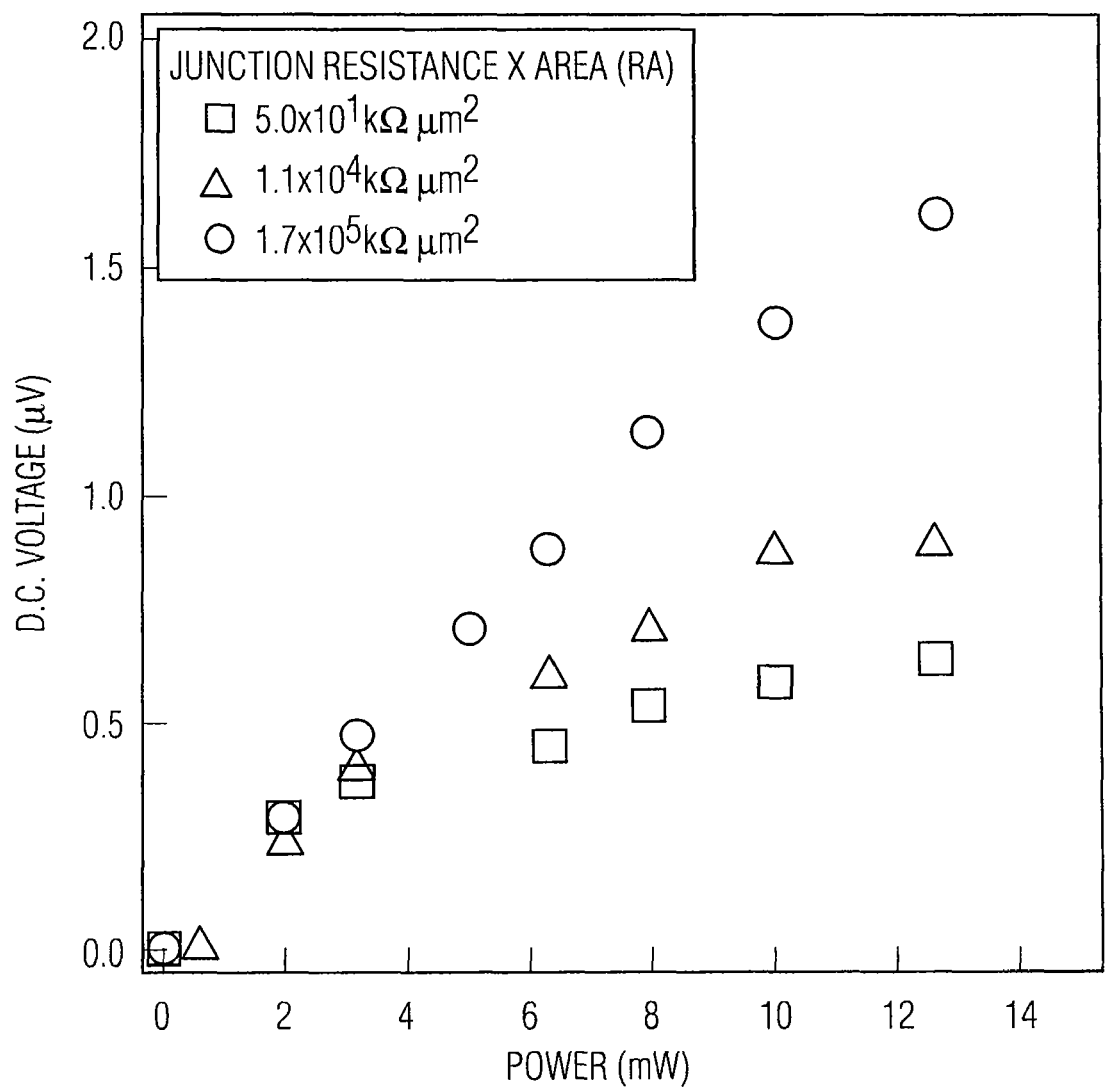
FIG. 9 is a graph of DC voltage as a function of power for various tunneling resistances for the device shown in FIG. 3A.

FIG. 9 is a graph of DC voltages of ΔV as a function of power for various tunneling resistances. In particular, tunneling resistances of $5.0 \times 10^1$ kΩ μm$^2$, $1.1 \times 10^4$ kΩ μm$^2$ and $1.7 \times 10^5$ kΩ μm$^2$ are shown. FIG. 9 illustrates that the ΔV increases as the tunneling resistance increases up to $1.7 \times 10^5$ kΩ μm$^2$.

Next measurement results using measurement setup 500 for device 402 (FIG. 4B) is shown with respect to FIGS. 10A, 10B, 10C, and 10D below.

Figure 10A:
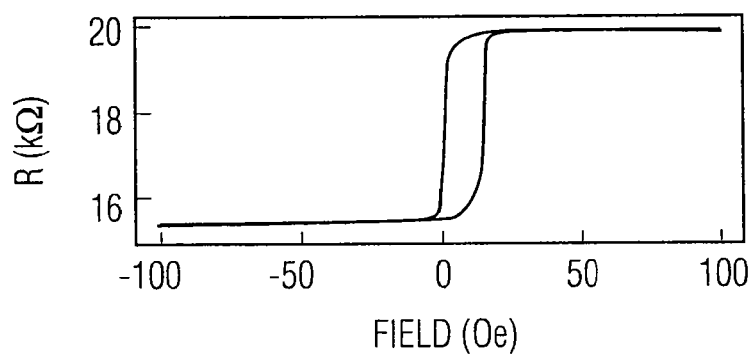
FIGS. 10A, 10B, 10C, and 10D are graphs of resistance, DC voltage for various input power, DC voltage for microwave frequencies and microwave frequencies as a function of an external magnetic field, respectively, for the device shown in FIG. 4B.
Figure 10B:
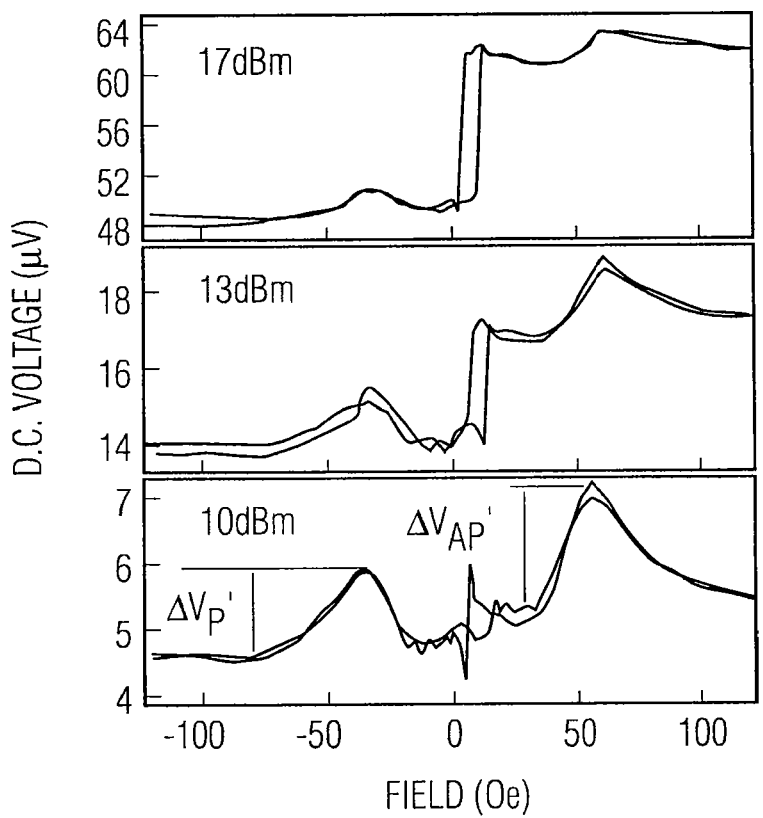
Figure 10C:
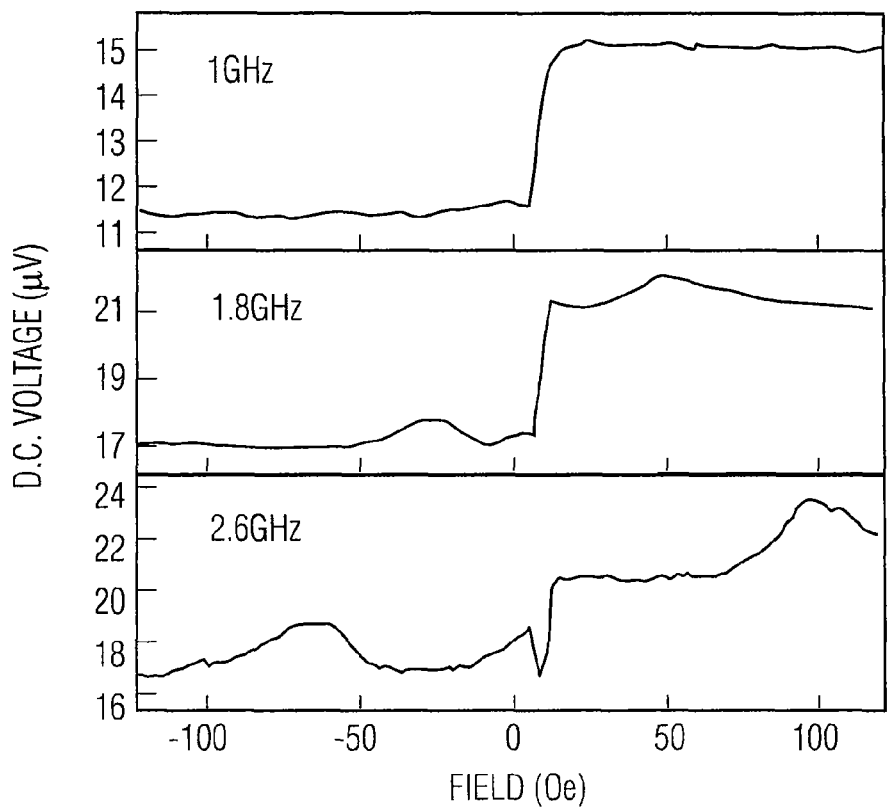
Figure 10D:
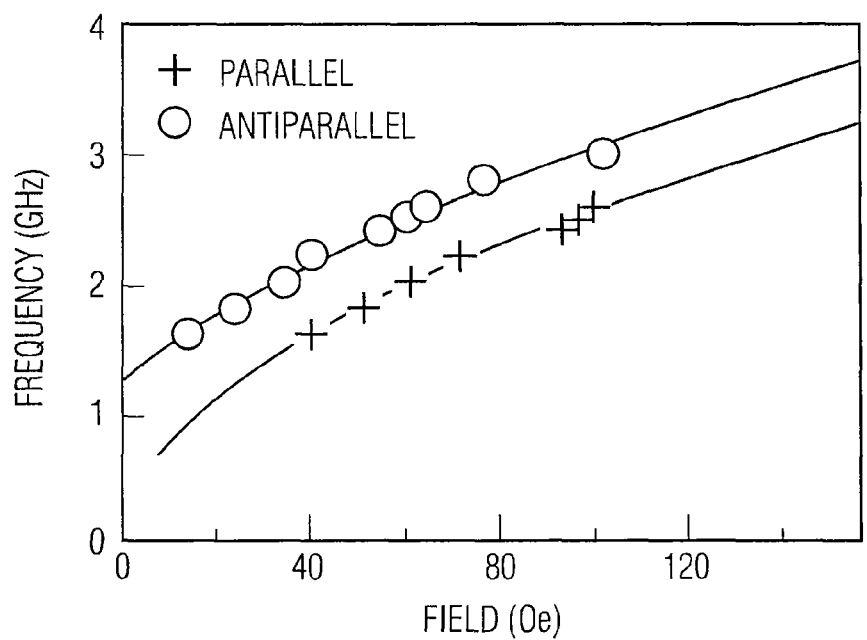

FIGS. 10A-10D summarize results of DC voltage and FMR with respect to device 402. In particular, FIG. 10A is a graph of resistance as a function of an external magnetic field; FIG. 10B is a graph of DC voltage for various input power as a function of an external magnetic field; FIG. 10C is a graph of DC voltage for various microwave frequencies as a function of an external magnetic field; and FIG. 10D is a graph of microwave frequency as a function of an external magnetic field. In FIGS. 10A-10D, the tunnel magnetoresistance ratio was measured to be 30% by a conventional magnetoresistance measurement without a microwave.

FIG. 10A is a graph of resistance as a function of an external magnetic field. Excluding the transitional region (around the zero field), resistance values in the positive field corresponds to the antiparallel (AP) spin state and resistance values in the negative field correspond to the parallel (P) spin state. Based on the resistance curve, the parallel (P) and the antiparallel (AP) spin states are well defined. In FIG. 10A, high and low resistance states correspond to the AP and the P states, respectively. An asymmetry of the coercivity field may be due to a magnetic coupling between top and bottom ferromagnetic electrodes.

FIG. 10B illustrates an external magnetic field dependence of the voltage across the magnetic tunnel junction (MTJ) at a 2 GHz microwave excitation with various input power (i.e. 10 dBm, 13 dBm and 17 dBm). At each input power, two peaks were clearly observed at 55 Oe and −36 Oe. In addition, the peak height of $\Delta V'_P$ and $\Delta V'_{AP}$ is observed to be on the order of microvolts. The peaks are independent of the sweep direction of the external magnetic field. The large transition at the low field (<10 Oe) may be due to a TMR effect caused by the switching of $Ni_{80}Fe_{20}$ magnetization associated with microwave-induced current flowing across the MTJ. The two curves in FIG. 10B represent voltage signals as the magnetic field is swept from the negative direction (−120 Oe) to the positive direction (120 Oe) and back to the negative direction (−120 Oe).

FIG. 10C is a graph of DC voltage for various microwave frequencies (i.e. 1 GHz, 1.8 GHz and 2.6 GHz) as a function of an external magnetic field. As shown in FIG. 10C, the induced DC voltage at various frequencies indicates that the peaks move to a higher field with increasing microwave frequency.

FIG. 10D is a graph of a frequency dependence of the peak field as well as a fitted Kittel model (solid lines) as a function of an external magnetic field, for both the parallel and anti-parallel spin states. The very good fit indicates that the DC voltage peaks are from FMR, i.e. from continuous spin precession. The fitting gives values of: 4πMs=9 kG, uniaxial anisotropy $H_a$=10 Oe, and unidirectional anisotropy $H_{ud}$=10 Oe. These values are quite reasonable for the $Ni_{80}Fe_{20}$ layer 412 (FIG. 4B) and for the unidirectional magnetic coupling provided by the magnetic tunnel junction.

Because of the microwave-induced current across the magnetic tunnel junctions, there may be a possibility that $\Delta V'_P$ and $\Delta V'_{AP}$ are caused by a tunnel magnetoresistance (TMR) effect due to a change of the $Ni_{80}Fe_{20}$ magnetization angle relative to the $Fe_{30}Co_{70}$ magnetization during precessing, with $\Delta V'_{P,AP}/V_{BG} = \pm TMR \sin^2(\theta/2)$. Here, $V_{BG}$ is the background voltage, a positive sign represents the P state and a negative sign represents the AP state. However, it is not likely that this is caused by the TMR effect because the ratio $\Delta V'_{P,AP}/V_{BG}$ actually decreases with increasing microwave power in the exemplary device 402 (FIG. 4B) of the present invention. This trend is not consistent with the fact that a larger microwave power typically gives rise to a larger spin precession cone angle, which therefore results in a larger $\Delta V'_{P,AP}/V_{BG}$ with a larger power.

In addition, although a dip, anticipated in the AP configuration for a TMR signal, seems to be present in FIGS. 10B and 10C, the peak is not associated with TMR signal. The mechanism of the DC voltage generation in device 402 (FIG. 4B) may be due to a combination of the DC voltage generation responsible for device 302 and due to spin current detection at the FeCo electrode. Thus, normally $\Delta V'_P$ and $\Delta V'_{AP}$ may show different values due to the spin configuration (parallel or antiparallel). A further experiment on device 402 using a MgO tunnel barrier has shown that ΔV is strongly dependent on the TMR value of the magnetic tunnel junction.

According to one aspect of the present invention, the device may be formed as a chip-level electromagnetic wave receiver or detector that provides improvements over conventional devices. For example, a conventional microwave receiver includes an antenna which converts electromagnetic wave radiation into a radio frequency (RF) current and a heterodyne receiver that receives the RF current. The heterodyne receiver typically includes components such as a band pass filter, a rectifier, an amplifier and a mixer which are used to provides low frequency (or DC) current. In contrast, the device of the present invention may perform the same functions of the conventional receiver with only a single multi-layer thin film (e.g., having a total thickness of less than 50 nm).

The present invention may be used to dramatically miniaturize the entire microwave receiver such that it can be integrated on the chip-level. In addition, because the present invention is capable of converting electromagnetic wave energy to a DC voltage, it may operate without a power supply. The present invention may also be used for telecommunication between chips, including telecommunication of spin information and/or ordinary charge information. In general, the present invention may be useful in information processing devices, for example, quantum computers and spin logic systems, and other spintronic devices.

According to another aspect of the present invention, an exemplary device may also be suitable as a platform for generating a pure spin current, due to its lower energy dissipation feature. A pure spin current generator may be used, for example, as a transducer that converts electromagnetic wave energy into a DC voltage (charge current). As compared to a spin polarized current that is generated with a charge current, a pure spin current generator may provide a reduced electron flow, while at the same time may obtain a similar spin angular momentum as for a spin polarized current. Because of the reduced electron flow, the pure spin current may decrease an energy dissipation (due to a Joule heating caused by electron charge flow).

Although the invention is illustrated and described herein with reference to specific embodiments; the invention is not intended to be limited to the details shown. Rather, various modifications may be made in the details within the scope and range of equivalents of the claims and without departing from the invention.

What is claimed:

1. A device for use in an electromagnetic wave detector, comprising:
    a first device layer formed from a nonmagnetic metallic material having a first contact;
    a second device layer formed from a nonmagnetic metallic material or an antiferromagnetic metallic material having a second contact; and
    a tunnel barrier layer and a resonating magnetic layer formed between the first and second device layers, the resonating magnetic layer configured to produce a spin current, responsive to an electromagnetic wave, that extends into the first and second device layers,
    wherein the device is configured to convert the spin current to a charge differential through a spin-charge coupling in the resonating magnetic layer, the charge differential being present between the first and second contacts.

2. The device according to claim 1, wherein the resonating magnetic layer is formed from a ferromagnetic material.

3. The device according to claim 1, wherein the resonating magnetic layer is formed from a ferrimagnetic material.

4. The device according to claim 1, wherein the resonating magnetic layer is formed from an antiferromagnetic material.

5. The device according to claim 1, wherein the second device layer is formed from the nonmagnetic metallic material selected from the group consisting of Cu, Al, Au, Ag, W, Pt and Pd.

6. The device according to claim 1, wherein the second device layer is formed form the antiferromagnetic metallic material including Cr.

7. The device according to claim 1, wherein the tunnel barrier layer is formed from an insulator material selected from the group consisting of aluminum oxide, magnesium oxide, hafnium oxide and zirconium oxide.

8. The device according to claim 1, wherein the resonating magnetic layer is formed above the first device layer and the tunnel barrier layer is formed above the resonating magnetic layer.

9. The device according to claim 1, wherein the tunnel barrier layer is formed above the first device layer and the resonating magnetic layer is formed above the tunnel barrier layer.

10. The device according to claim 9, further comprising a magnetic layer and an antiferromagnetic layer formed between the first device layer and the tunnel barrier layer.

11. The device according to claim 1, wherein the first device layer includes at least two layers, one of the at least two layers forming a coplanar waveguide.

12. The device according to claim 1, wherein the resonating magnetic layer generates magnetic layer precessing responsive to the electromagnetic wave to produce the spin current and transmits the spin current to the first and second device layers.

13. The device according to claim 1, wherein the device has an impedance that matches an ambient impedance surrounding the device.

14. An electromagnetic wave detector comprising:
    a device comprising:
        a first device layer formed from a nonmagnetic metallic material,
        a second device layer formed from a nonmagnetic metallic material or an antiferromagnetic metallic material, and
        a tunnel barrier layer and a resonating magnetic layer formed between the first and second device layers, the resonating magnetic layer configured to produce a spin current, responsive to an electromagnetic wave, that extends into the first and second device layers, the device being configured to convert the spin current to a charge differential through a spin-charge coupling in the resonating magnetic layer; and
    a detector coupled to the first and second device layers for measuring the charge differential present between the first and second device layers.

15. The electromagnetic wave detector according to claim 14, wherein the charge differential includes at least one of a voltage or a current.

16. The electromagnetic wave detector according to claim 14, wherein the resonating magnetic layer generates magnetic layer precessing responsive to the electromagnetic wave to produce the spin current.

17. The electromagnetic wave detector according to claim 14, wherein the electromagnetic wave has a frequency and the resonating magnetic layer has a resonance frequency, and the detector measures a maximum charge differential when the frequency of the electromagnetic wave corresponds to the resonance frequency.

18. The electromagnetic wave detector according to claim 17, further comprising a magnetic field generator configured to generate a direct current (DC) magnetic field for adjusting the resonance frequency of the resonating magnetic layer.

19. A method for forming a device for use in an electromagnetic wave detector, the method comprising:
    forming a first device layer from a nonmagnetic metallic material;
    forming a second device layer from a nonmagnetic metallic material or an antiferromagnetic metallic material;
    forming a tunnel barrier layer and a resonating magnetic layer between the first and second device layers; and
    forming first and second contacts on the first and second device layers, respectively,
    wherein the resonating magnetic layer is formed to produce a spin current, responsive to an electromagnetic wave, that extends into the first and second device layers and the device is formed to convert the spin current to a charge differential, through a spin-charge coupling in the resonating magnetic layer, the charge differential being present between the first and second contacts.

20. The method according to claim 19, wherein the steps of forming the tunnel barrier layer and the resonating magnetic layer include:
    forming the tunnel barrier layer above the first device layer; and
    forming the resonating magnetic layer above the tunnel barrier layer.

21. The method according to claim 19, forming the tunnel barrier layer and the resonating magnetic layer including:
- forming the resonating magnetic layer above the first device layer; and
- forming the tunnel barrier layer above the resonating magnetic layer.

22. The method according to claim 19, wherein the device is formed with an impedance that matches an ambient impedance surrounding the device.

* * * * *

UNITED STATES PATENT AND TRADEMARK OFFICE
CERTIFICATE OF CORRECTION

PATENT NO. : 8,669,762 B2
APPLICATION NO. : 12/865182
DATED : March 11, 2014
INVENTOR(S) : Moriyama et al.

It is certified that error appears in the above-identified patent and that said Letters Patent is hereby corrected as shown below:

In the Claims

Column 9, line 25, claim 1, delete "nonma netic" and insert --nonmagnetic-- therefor.

Column 9, line 26, claim 1, delete "antiferroma netic" and insert --antiferromagnetic-- therefor.

Signed and Sealed this
Twenty-seventh Day of May, 2014

Michelle K. Lee
*Deputy Director of the United States Patent and Trademark Office*